Patented Nov. 1, 1949

2,487,007

UNITED STATES PATENT OFFICE 2,487,007

PRODUCTION OF BUTINEDIOL

Joseph Frederic Walker, Westfield, N. J., and Thomas E. Londergan, Niagara Falls, N. Y., assignors to E. I. du Pont de Nemours & Company, Wilmington, Del., a corporation of Delaware No Drawing. Application October 4, 1947, Serial No. 778,022

2 Claims. (Cl. 260—635)

This invention relates to an improved process for the production of 2-butinediol-1,4.

This application is a continuation-in-part of our copending application Serial No. 556,474, filed September 29, 1944, and now abandoned.

The recently granted patent to Reppe et al., U. S. Patent No. 2,232,867 discloses a process for the production of 2-butinediol-1,4 by reacting an aqueous solution of formaldehyde with acetylene in the presence of a metal acetylide catalyst selected from the group consisting of copper acetylide, silver acetylide, gold acetylide, and mercury acetylide. By the process of said patent, it is impossible to obtain a satisfactory yield of the butinediol within a reasonable period of time unless the process is operated at super-atmospheric pressure. On the other hand, when super-atmospheric pressures are used, as suggested in the patent, the process is dangerous by reason of the explosion hazard of acetylene under pressure. The process of the above-said patent is also subject to the objection that the 2-butinediol-1,4 produced contains, as an impurity, small amounts of propargyl alcohol.

It is an object of this invention to provide a process for the production of 2-butinediol-1,4 which will have an excellent yield and may be carried out in a minimum period of time at atmospheric pressure.

It is another object of this invention to provide a process for the production of 2-butinediol-1,4 which will have an excellent yield and may be carried out in a minimum period of time without objectionable explosion hazard.

It is another object of this invention to provide a process for the production of 2-butinediol-1,4 which is substantially free from propargyl alcohol.

Other objects of the invention will appear hereinafter.

The objects of this invention may be accomplished, in general, by reacting a polyoxymethylene glycol containing between eight and one hundred formaldehyde units per molecule with acetylene in dimethyl formamide containing not to exceed 5% free water. The reaction is carried out in the presence of a metal acetylide taken from the group consisting of copper acetylide, silver acetylide, gold acetylide, and mercury acetylide, and at a temperature between 60° C. and 150° C.

The above-said polyoxymethylene glycol includes paraformaldehyde, which Staudinger has defined as a mixture of polyoxymethylene glycols containing between eight and one hundred formaldehyde units, as well as similar polymers of formaldehyde which may have a more uniform degree of polymerization. It has been found, in accordance with this invention, that commercial formaldehyde solutions or similar aqueous solutions of formaldehyde cannot be reacted with acetylene at atmospheric pressure to produce a good yield of the butinediol unless the reaction is carried out for a long period of time (a period of two or more days). By the use of paraformaldehyde, or similar polyoxymethylene glycol, in dimethyl formamide containing not to exceed 5% free water, a good yield can be obtained at atmospheric pressure in a period of two to six hours. Not only is the paraformaldehyde more reactive than formaldehyde, but free water in larger quantities than about 5%, as well as alcohol and hydrocarbons, in the reaction medium have a decided inhibiting effect on the reaction. On the other hand, it has been found that polyoxymethylene glycols having more than one hundred formaldehyde units per molecule, i. e., formaldehyde polymers known as alpha-polyoxymethylene, are not suitable for the production of 2-butinediol-1,4 since they are not sufficiently reactive.

Paraformaldehyde is readily produced by the evaporation of a formaldehyde solution, and the process of this invention may be carried out with paraformaldehyde produced "in situ" in the reaction medium by passing an aqueous formaldehyde solution into the hot reaction medium through which an excess of acetylene is being swept so as to carry off excess water. This procedure must be so controlled that a concentration of more than 5% free water will never be present in the reaction mixture. Paraformaldehyde can also be produced "in situ" by passing formaldehyde gas into a substantially non-aqueous reaction mixture. Aqueous formaldehyde solutions such as commonly marketed, or monomeric formaldehyde gas, as such, are not satisfactory for use in carrying out the present invention.

Acetylene usually contains a considerable proportion of water. It may, therefore, be necessary to first dry the acetylene before passing the same into the reaction mixture to prevent building up a concentration of more than 5% free water.

In accordance with the present invention, the reaction between the acetylene and the polyoxymethylene glycol is carried out in dimethyl formamide. As above stated, water, alcohol, and hydrocarbons have now been found to inhibit the reaction. The dimethyl formamide employed, must, therefore, contain less than 5% free water or like reaction-inhibiting liquid. The amount of the dimethyl formamide employed is not critical. A sufficient amount should, of course, be used to maintain the reaction mass in a liquid, dissolved or slurry, form. In a batch type process, dimethyl formamide is preferably employed in an amount between three and twenty times the weight of the polyoxymethylene glycol present in the reaction mass. In a continuous type process, the butinediol may be continuously removed by distillation of the reaction mass and dimethyl formamide recycled. The 2-butinediol-1,4 produced by the reaction will, unless removed, accumulate in the reaction mass. It has been found that small amounts of the butinediol will not interfere with the reaction; however, if it is allowed to accumulate until it exceeds about 50%, based on the combined weight of the butinediol and the dimethyl formamide, it will materially interfere with the production of good yields. It is, therefore, preferred that the concentration of the butinediol product in the reaction mass be not allowed to exceed 50% based on the combined weight of the butinediol and the dimethyl formamide. This may be readily accomplished by discontinuing the reaction or by adding additional dimethyl formamide in a batch type process, or by continuous removal of the butinediol from the dimethyl formamide by distillation of the reaction mass and recycling of the dimethyl formamide, or by continuous addition of dimethyl formamide in a continuous type process.

The metal acetylide catalyst, i. e., copper acetylide, silver acetylide, gold acetylide, or mercury acetylide, or any mixture or combination thereof, may be prepared from aqueous metal salt solutions as disclosed in the above-said patent to Reppe et al. The metal acetylide should be contained on a catalyst support such as fuller's earth, infusorial earth, activated carbon, silica gel, or the like. The preferred metal acetylide catalyst material for use in accordance with this invention is one produced by mixing particles of a catalyst support having a size not to exceed 300 mesh with an aqueous solution of a metal salt and precipitating the metal acetylide on the particles of catalyst support by passing acetylene through the said mixture. The quantity of metal acetylide precipitated on the particles of support should not exceed 20%, by weight, of the final dry catalyst. This particular catalyst and the method of producing the same is the subject of our copending patent application Serial No. 561,150, filed October 30, 1944, and now abandoned. The amount of catalyst present in the reaction mass may be varied between wide limits, for example, the presence of 1% to 50%, based on the weight of the polyoxymethylene glycol present, will catalyze the reaction.

The reaction between the polyoxymethylene glycol and the acetylene will take place at atmospheric pressure at any temperature between 60° C. and 150° C. In order that good commercial yields be obtained in minimum time, and in order to maintain the process under safe conditions of operation, it is preferred to carry out the reaction at a temperature between 115° C. and 125° C.

The following detailed examples are given to illustrate certain preferred methods for carrying out the present invention, it being understood, of course, that the precise details set forth in these examples are to be taken as illustrative and not limitative of the invention.

Example I

A suspension of 24 grams of copper acetylide on 120 grams, 300-mesh or finer, substantially pure, neutral activated carbon, in 500 grams of dimethyl formamide was warmed to 115° C. and saturated with dry acetylene. To this mixture, 63 grams of paraformaldehyde (equivalent to two gram-molecular weights of $CH_2O$) were added, and dry acetylene was passed in with agitation at a rate only slightly in excess of the rate of acetylene absorption. Additional paraformaldehyde was added after one-half mol of acetylene had been absorbed and addition was continued until a total of 315 grams or equivalent to 10 gram-molecular weights of $CH_2O$ as paraformaldehyde had been added. When acetylene absorption was complete, the reaction mixture was filtered and the catalyst washed with dimethyl formamide, these washings being added to the filtrate. The 2-butinediol-1,4 was isolated from the filtered reaction mixture by vacuum distillation, distilling at 120° C. to 145° C. at 7 mm. On redistillation, a substantially pure product, boiling at 130° C. to 135° C. at 7 mm., was secured. A yield of 400 grams or 93% theoretical was obtained. The butinediol produced by the above reaction was free from propargyl alcohol.

Example II

For purposes of comparison, five grams (1/6 mol) of formaldehyde in 50 cc. of water and five grams (1/6 mol) of formaldehyde as paraformaldehyde in 50 cc. dimethyl formamide were each agitated in a current of acetylene at 80° C., using one gram of copper acetylide on five grams of powdered bone charcoal in each case. In the first case (formaldehyde in water), acetylene was absorbed at a rate of 155 cc. per hour; in the second case (paraformaldehyde plus dimethyl formamide), the rate of absorption was 480 cc. per hour. Approximately the same rate of absorption was obtained when 50 cc. of 37% formaldehyde was employed in place of 50 cc. 10% aqueous solution.

Example III

A comparison of the rate at which 2-butinediol-1,4 was formed in a 100 cc. volume of various solvents at 80° C. was made by measuring acetylene absorption per hour for reaction mixtures containing 10% formaldehyde added as paraformaldehyde plus one gram of copper acetylide on five grams of powdered active carbon.

| Solvent | Acetylene Absorbed per hour in cc.[1] |
| --- | --- |
| Decalin | less than 160 |
| Formamide | 200 |
| 95% Dimethyl formamide (5% water) | 540 |
| 100% Dimethyl formamide | 960 |

[1] Calc. for Standard Temperature and Pressure.

Example IV

An approximately equimolar mixture of acetylene and monomeric formaldehyde gas containing about 1 mol each of formaldehyde and acetylene was bubbled through 300 grams of dimethyl formamide containing eight grams of copper acetylide on 40 grams of substantially pure, neutral activated carbon, with agitation at 100° C. in the course of two and one-quarter hours. In this time, only about 13% of the acetylene was absorbed, indicating that only 25% of the theoretical quantity had reacted. At the same time, all of the formaldehyde was absorbed and held by the reaction mixture. Acetylene was then passed through the mixture for four and one-quarter hours, in which time about 65% of the theoretical amount reacted, making a total of 90% theoretical for one mol formaldehyde.

These results indicate that during the first two and one-quarter hours, about 75% of the formaldehyde either polymerized or formed a complex with the dimethyl formamide since monomer could not be absorbed as such at 100° C. The rate of acetylene absorption was faster in the last part of the experiment, indicating that the reaction proceeded more rapidly with polymer or complex than with monomeric formaldehyde.

In all of the above examples the acetylene was passed into the solvent containing formaldehyde, or formaldehyde polymer, at atmospheric pressure.

By the process of this invention 2-butinediol-1,4 is readily produced at atmospheric pressure and, therefore, without the menace of explosion such as is present in the handling or maintaining of acetylene at pressures above atmospheric. The reaction takes place rapidly with excellent yields without the production of propargyl alcohol, and the butinediol can be readily isolated from the solvents employed since it is substantially free from water.

Throughout the specification and claims, proportions and percentages refer to proportions and percentages by weight unless otherwise specified.

Since it is obvious that many changes and modifications can be made in the above-described details without departing from the nature and spirit of this invention, it is to be understood that the invention is not to be limited to the above- said details except as set forth in the appended claims.

What is claimed is:

1. A process for the production of 2-butinediol-1,4 which comprises reacting, at a temperature between 60° C. and 150° C., a polyoxymethylene glycol containing between eight and one hundred formaldehyde units per molecule with acetylene in dimethyl formamide which does not contain to exceed 5% by weight free water, and which is present in sufficient amount to maintain the reaction mass in liquid form, said reaction being carried out in the presence of a metal acetylide catalyst taken from the group consisting of copper acetylide, silver acetylide, gold acetylide, and mercury acetylide.

2. A process for the production of 2-butinediol-1,4 which comprises reacting, at a temperature between 115° C. and 125° C., a polyoxymethylene glycol containing between eight and one hundred formaldehyde units per molecule with acetylene in dimethyl formamide which does not contain to exceed 5% by weight free water, and which is present in sufficient amount to maintain the reaction mass in liquid form, said reaction being carried out in the presence of a metal acetylide catalyst taken from the group consisting of copper acetylide, silver acetylide, gold acetylide, and mercury acetylide.

JOSEPH FREDERIC WALKER.
THOMAS E. LONDERGAN.

REFERENCES CITED

The following references are of record in the file of this patent:

UNITED STATES PATENTS

| Number | Name | Date |
| --- | --- | --- |
| 2,106,181 | Kreimeier | Jan. 25, 1938 |
| 2,232,867 | Reppe et al. | Feb. 25, 1941 |
| 2,250,445 | Bruson et al. | July 29, 1941 |